(12) United States Patent
Fernandes et al.

(10) Patent No.: US 7,769,878 B2
(45) Date of Patent: *Aug. 3, 2010

(54) TUNNELING IPV6 PACKETS

(75) Inventors: Lilian S. Fernandes, Austin, TX (US); Vinit Jain, Austin, TX (US); Vasu Vallabhaneni, Austin, TX (US); Patrick T. Vo, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 12/183,779

(22) Filed: Jul. 31, 2008

(65) Prior Publication Data

US 2008/0301312 A1    Dec. 4, 2008

Related U.S. Application Data

(63) Continuation of application No. 10/992,380, filed on Nov. 18, 2004, now Pat. No. 7,437,470.

(51) Int. Cl.
G06F 15/16 (2006.01)
(52) U.S. Cl. .................. 709/230; 709/224; 709/232; 370/395.52
(58) Field of Classification Search ............. 709/224, 709/228, 230, 232; 370/395.52
See application file for complete search history.

(56) References Cited

U.S. PATENT DOCUMENTS

| 7,116,681 | B1 * | 10/2006 | Hovell et al. | 370/466 |
| 7,188,191 | B1 * | 3/2007 | Hovell et al. | 709/245 |
| 7,305,481 | B2 * | 12/2007 | Blanchet et al. | 709/230 |
| 7,339,937 | B2 * | 3/2008 | Mitra et al. | 370/395.53 |
| 7,437,470 | B2 * | 10/2008 | Fernandes et al. | 709/230 |

FOREIGN PATENT DOCUMENTS

| CN | 1376351 A | 10/2002 |
| CN | 1525713 A | 9/2004 |

* cited by examiner

*Primary Examiner*—Khanh Q Dinh
(74) *Attorney, Agent, or Firm*—H. Artoush Ohanian; Matthew Talpis; Biggers & Ohanian, LLP.

(57) ABSTRACT

Methods, systems, and products are provided for tunneling IPv6 packets. Embodiments include receiving, by an origin IPv6 border router from an origin IPv6 host, an IPv6 packet having an IPv6 destination address; receiving, by an origin IPv6 border router from an origin IPv6 host, an IPv4 address for a destination IPv6 border router retrieved from a data structure associating IPv6 destination addresses with IPv4 addresses for destination IPv6 border routers; encapsulating, by the origin IPv6 border router, the IPv6 packet in an IPv4 packet; and sending the encapsulated packet to a destination IPv6 border router at the IPv4 address. In many embodiments, encapsulating, by the origin IPv6 border router, the IPv6 packet in an IPv4 packet is carried out by adding an IPv4 header to the IPv6 packet.

4 Claims, 5 Drawing Sheets

DNS Resource Record
452

Domain Name ~ 454

IPv6 Destination Address ~ 456

IPv4 Border Router Address ~ 458

FIG. 4

TUNNELING IPV6 PACKETS

BACKGROUND OF THE INVENTION

1. Field of the Invention

The field of the invention is data processing, or, more specifically, methods, systems, and products for tunneling IPv6 packets.

2. Description of Related Art

The Internet Protocol, version 6 ('IPv6'), is a version of Internet Protocol (IP) designed to be an evolutionary step from the widely used version, Internet Protocol, version 4 ('IPv4'). IPv6 provides increased address space, a simplified header format, support for authentication and privacy, auto-configuration of address assignments, and new quality-of-service capabilities.

Despite the growing use of IPv6, IPv4 is still the dominant protocol of the Internet and therefore transition mechanisms have been provided to use the IPv4 routing infrastructure to send IPv6 packets. 'Tunneling' allows an IPv6 compatible host or router to transmit IPv6 packets across existing IPv4 networks. Tunneling an IPv6 packet across an IPv4 network is typically carried out by encapsulating the IPv6 packet in an IPv4 packet and sending the packet to an IPv4 compatible router. Encapsulating an IPv6 packet in an IPv4 packet is carried out by adding an IPv4 header to the packet making the packet transmittable across an IPv4 network. Conventional techniques for tunneling IPv6 packets across IPv4 networks typically require a particular IPv6 compatible origin router to be manually configured with an IPv4 destination address of another IPv6 compatible router that receives the encapsulated packet. Manually configuring routers with such destination IPv4 addresses is time consuming and cumbersome for system administrators. Such manual configuration also makes routing encapsulated packets inflexible, because only a limited number of such the destination addresses are manually configured onto an IPv6 compatible router. There is therefore an ongoing need for improved methods, systems, and products for tunneling IPv6 packets.

SUMMARY OF THE INVENTION

Methods, systems, and products are provided for tunneling IPv6 packets. Embodiments include receiving, by an origin IPv6 border router from an origin IPv6 host, an IPv6 packet having an IPv6 destination address; receiving, by an origin IPv6 border router from an origin IPv6 host, an IPv4 address for a destination IPv6 border router retrieved from a data structure associating IPv6 destination addresses with IPv4 addresses for destination IPv6 border routers; encapsulating, by the origin IPv6 border router, the IPv6 packet in an IPv4 packet; and sending the encapsulated packet to a destination IPv6 border router at the IPv4 address. In many embodiments, encapsulating, by the origin IPv6 border router, the IPv6 packet in an IPv4 packet is carried out by adding an IPv4 header to the IPv6 packet.

Typical embodiments also include decapsulating, by the destination IPv6 border router, the encapsulated packet; and forwarding, by the destination IPv6 border router, the decapsulated packet to a destination host having the destination IPv6 address. In many embodiments, decapsulating, by the destination IPv6 border router, the encapsulated packet is carried out by removing an IPv4 header added by the origin border router from the encapsulated packet.

Typical embodiments also include identifying, by the IPv6 host, an IPv6 destination address for the packet; retrieving, from a data structure associating IPv6 destination addresses with IPv4 addresses for destination IPv6 border routers, an IPv4 address for a destination IPv6 border router; sending an IPv6 packet having the IPv6 destination address to the origin IPv6 border router; and providing to an origin IPv6 border router an IPv4 address for an associated destination IPv6 border router for the IPv6 packet. In many embodiments, the data structure associating IPv6 destination addresses with IPv4 addresses for destination IPv6 border routers includes a DNS resource record.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a block diagram of a data structure useful in tunneling IPv6 packets according to embodiments of the present invention.

DETAILED DESCRIPTION OF EXEMPLARY EMBODIMENTS

Introduction

The present invention is described to a large extent in this specification in terms of methods for tunneling IPv6 packets. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executed on computer hardware, nevertheless, alternative embodiments implemented as firmware or as hardware are well within the scope of the present invention.

DETAILED DESCRIPTION

Figure 1:
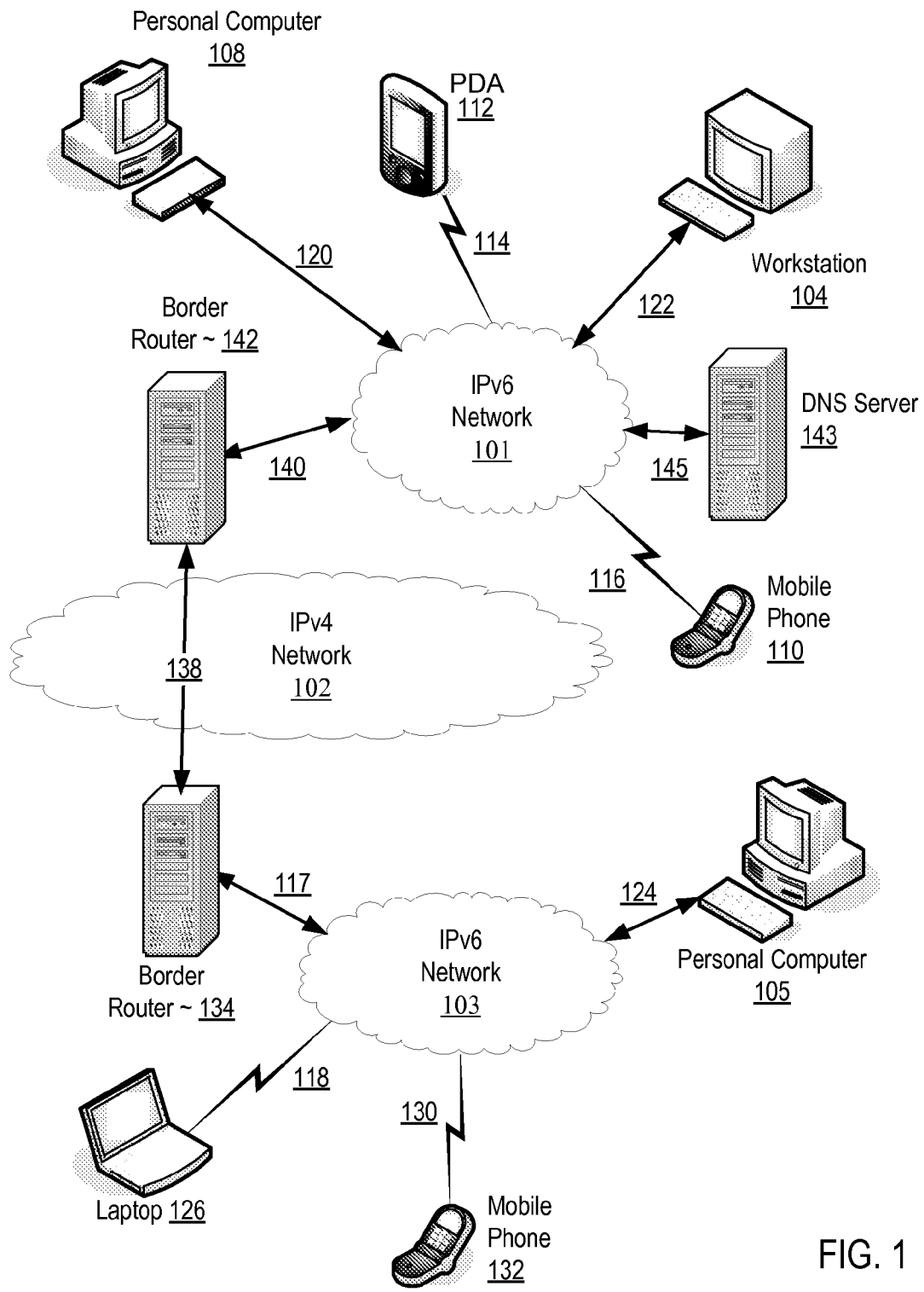
FIG. 1 sets forth an exemplary data processing system capable of tunneling IPv6 packets according to embodiments of the present invention.

Methods, systems, and products for tunneling IPv6 packets are described with reference to the accompanying drawings, beginning with reference to FIG. 1. FIG. 1 depicts an exemplary data processing system capable of tunneling IPv6 packets according to embodiments of the present invention. The system of FIG. 1 includes a number of computers connected for data communications in three networks (101, 102, and 103). In the example of FIG. 1, several exemplary devices including a PDA (112), a computer workstation (104), a mobile phone (110), and personal computer (108) are connected to an IPv6 network (101). In the example of FIG. 1, the network enabled mobile phone (110) connects to the IPv6 network (101) through a wireless connection (116). The workstation (104) connects to the IPv6 network (101) through a wireline connection (122). The PDA (112) connects to the IPv6 network (101) through a wireless connection (114). And the personal computer (108) connects to the IPv6 network (101) through a wireline connection (120).

The example of FIG. 1 also includes another IPv6 network (103). Several exemplary devices including a laptop (126), a network enabled mobile phone (132), and a personal computer (105) are connected to the IPv6 network (103). In the example of FIG. 1, the laptop connects to the IPv6 network (103) through a wireless connection (118). The mobile phone (132) connects to the IPv6 network (103) through a wireless connection (130). And the personal computer (105) connects to the IPv6 network (103) through a wireline connection (124).

In the example of FIG. 1, each IPv6 network (101 and 103) have border router (142 and 134) capable of tunneling IPv6 packets according to embodiments of the present invention. The border router (142) is connected to the IPv6 network (101) through a wireline connection (140) and the border router (134) is connected to the other IPv6 network (103) through a wireline connection (117). The exemplary border routers are is so called because they are capable of routing IPv6 packets from devices within their respective IPv6 network to other devices outside of their IPv6 network. These routers therefore reside on the border of their respective IPv6 network.

To route IPv6 packets from one IPv6 network to another IPv6 network, the exemplary border routers of FIG. 1 coupled for data communications to one another through an IPv4 network (102). In the example of FIG. 1, IPv6 packets are tunneled (138) across the IPv4 network from one border router (142) to another border router (134) for transmission from one IPv6 network (101) to another IPv6 network (103).

In the example of FIG. 1, to send an IPv6 packet from an origin IPv6 host (108, 112, 104, 110) in an origin IPv6 network (101) to an IPv6 destination host (126, 132, 105) in a destination IPv6 network (103), an origin host (108, 112, 104, 110) identifies an IPv6 destination address for a host receiving the packet. Identifying an IPv6 destination address for the packet is carried in the system of FIG. 1 by resolving a domain name for the destination host. Resolving a domain name for the destination host is carried out by retrieving from a DNS server (143) a DNS resource record an IP address.

The Domain Name System ("DNS") is a name service typically associated with the Internet. The DNS translates domain names in network addresses. The domain names are names of computer hosts providing network services such as web servers, email servers, and others. In the example of FIG. 1, the network addresses are IPv6 addresses. Domain names are typically expressed in alphabetic text, easier for humans to work with than numeric network addresses. Networks, however, operate on numeric network addresses. Every time a user requests a resource by use of a domain name, therefore, a DNS service somewhere translates the domain name into a corresponding network address. The domain name "ibm.com," for example, might translate into the IP network address 129.42.19.99. The goal of domain names is to provide a mechanism for naming resources in such a way that the names are usable in different hosts, networks, protocol families, internets, and administrative organizations. From the user's point of view, domain names are useful as arguments to a function, called a resolver, which retrieves information associated with the domain name. Thus a user might ask for the host address or mail information associated with a particular domain name. To enable the user to request a particular type of information, an appropriate query type is passed to the resolver with the domain name. To the user, the domain tree is a single information space; the resolver is responsible for hiding the distribution of data among name servers from the user.

Resolvers are programs that extract information from DNS name servers in response to client requests. Resolvers must be able to access at least one name server and use that name server's information to answer a query directly, or pursue the query using referrals to other name servers. A resolver will typically be a system routine that is directly accessible to user programs, so that no protocol usually is needed between the resolver and the user program. Both the name server and resolver are software processes executing on one or more computers. Essentially, the resolver submits a query to a name server about a domain name. The name server "resolves" the mapping of the domain name to a machine address and sends the machine address back to the resolver as the "answer" to the query.

In many network hosts, a resolver is part of the operating system. More particularly, in the case of TCP/IP, the resolver is often part of the TCP/IP client accessible from the application level through a C or C++ call through an Application Programming Interface ("API") such as the sockets API. The Microsoft Windows™ Sockets API, for example, provides functions named gethostbyname( ) and WSAAsyncGetHostByName( ) that respectively work synchronously and asynchronously to obtain network addresses for network hosts given the hosts' domain names as inputs. Similarly, the Java method InetAddress.getByName(string host) is a static Java method that instantiates an object of class InetAddress representing the internet protocol address of a network host.

DNS includes a request/response data communications protocol with standard message types. Gethostbyname( ) and InetAddress.getByName( ) are examples of API calls to a TCP/IP client in an operating system such as Unix or Windows. Such a TCP/IP client typically bears one or more pre-designated DNS server addresses, designations of a primary DNS server for a computer and possibly one or more secondary DNS servers. In response to a call to a resolver function such as gethostbyname( ) and InetAddress.getByName( ), a TCP/IP client sends a DNS request message containing the domain name in a standard format to a predesignated primary DNS server requesting a corresponding network address, and, upon receiving a response message, provides the network address in return to the calling program. When a calling application receives the network address from the operating system, it can use the network address to access resources on the network host identified by the domain name associated with the network address.

DNS resource records may advantageously be modified in accordance with the present invention to include in addition to the requested IPv6 destination address an associated IPv4 address for a destination border router capable of delivering a packet to the IPv6 destination address. That is, the DNS resource record also includes an IPv4 address capable of receiving encapsulated IPv6 packets intended for the associated IPv6 destination address.

In the system of FIG. 1 therefore a host (108, 112, 104, 110) sends an IPv6 packet having the IPv6 destination address to the origin IPv6 border router and also provides to the border router an IPv4 address identified in the DNS record for an associated destination border router. In some embodiments, the origin host embeds the IPv4 address for the destination border router into an extension header of the IPv6 packet.

In the system of FIG. 1, the border router (142) is capable of receiving the IPv6 packet from the host, receiving the IPv4 address for a destination IPv6 border router, encapsulating the IPv6 packet in an IPv4 packet, and sending the encapsulated packet to a destination IPv6 border router (134) at the IPv4 address. The border router (134) of FIG. 1 is capable of decapsulating the encapsulated packet and forwarding the decapsulated packet to a destination host (126, 132, 105) having the destination IPv6 address.

The network connection aspect of the architecture of FIG. 1 is only for explanation, not for limitation. In fact, systems for displaying a computer resource through a preferred browser according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

The arrangement of hosts, border routers and devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

As mentioned above, tunneling IPv6 packets in accordance with the present invention is generally implemented with computers, that is, with automated computing machinery. For further explanation, FIG. 2 sets forth a block diagram of automated computing machinery comprising a border router (134) useful in tunneling IPv6 packets according to embodiments of the present invention. The border router (134) of FIG. 2 includes at least one computer processor (156) or 'CPU' as well as random access memory (168) ("RAM"). Stored in RAM (168) is an operating system (154). Operating systems useful in border routers according to embodiments of the present invention include Unix, AIX, Linux, Microsoft NT™, and many others as will occur to those of skill in the art. Operating system (154) in the example of FIG. 2 is shown in RAM (168), but many components of an operating system typically are stored in non-volatile memory (166) also.

Also stored in RAM (168) is a Tunnel Broker (188) capable of tunneling packets according to the present invention. The tunnel broker (188) is software capable of receiving from an origin IPv6 host an IPv6 packet having an IPv6 destination address; receiving from an origin IPv6 host, an IPv4 address for a destination IPv6 border router; encapsulating the IPv6 packet in an IPv4 packet; and sending the encapsulated packet to a destination IPv6 border router at the IPv4 address. Tunnel brokers such as the one depicted in FIG. 2 are typically installed on border routers and advantageously tunnel IPv6 packets according to embodiments of the present invention.

Figure 2:
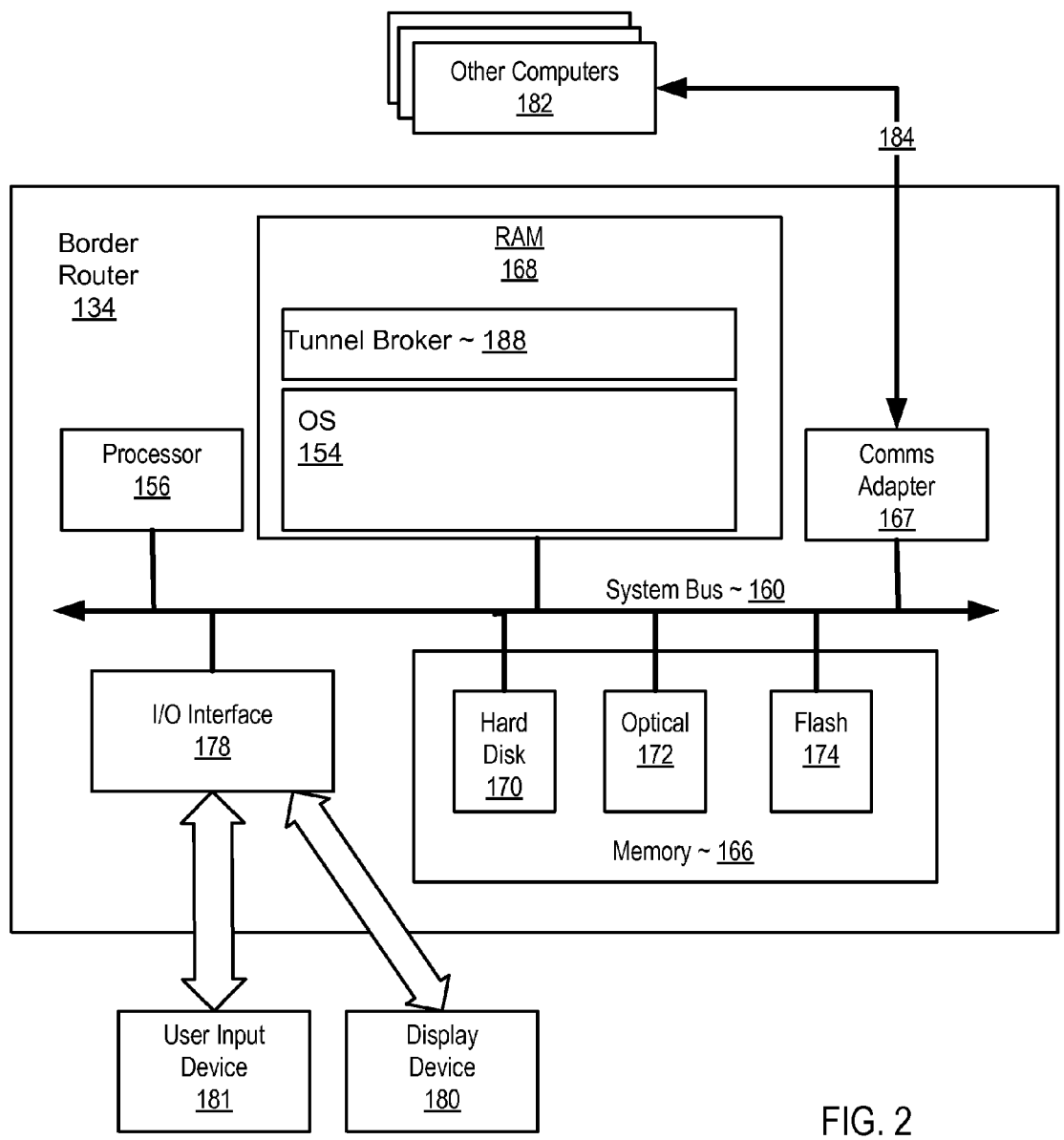
FIG. 2 sets forth a block diagram of a border router useful in tunneling IPv6 packets according to embodiments of the present invention.

The border router (134) of FIG. 2 includes non-volatile computer memory (166) coupled through a system bus (160) to processor (156) and to other components of the border router. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary border router (134) of FIG. 2 includes a communications adapter (167) for implementing connections for data communications (184), including connections through networks, to other computers (182), including servers, clients, and others as will occur to those of skill in the art. Communications adapters implement the hardware level of connections for data communications through which local devices and remote devices or servers send data communications directly to one another and through networks. Examples of communications adapters useful for tunneling IPv6 packets according to embodiments of the present invention include modems for wired dial-up connections, Ethernet (IEEE 802.3) adapters for wired LAN connections, and 802.11b adapters for wireless LAN connections.

The example border router of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
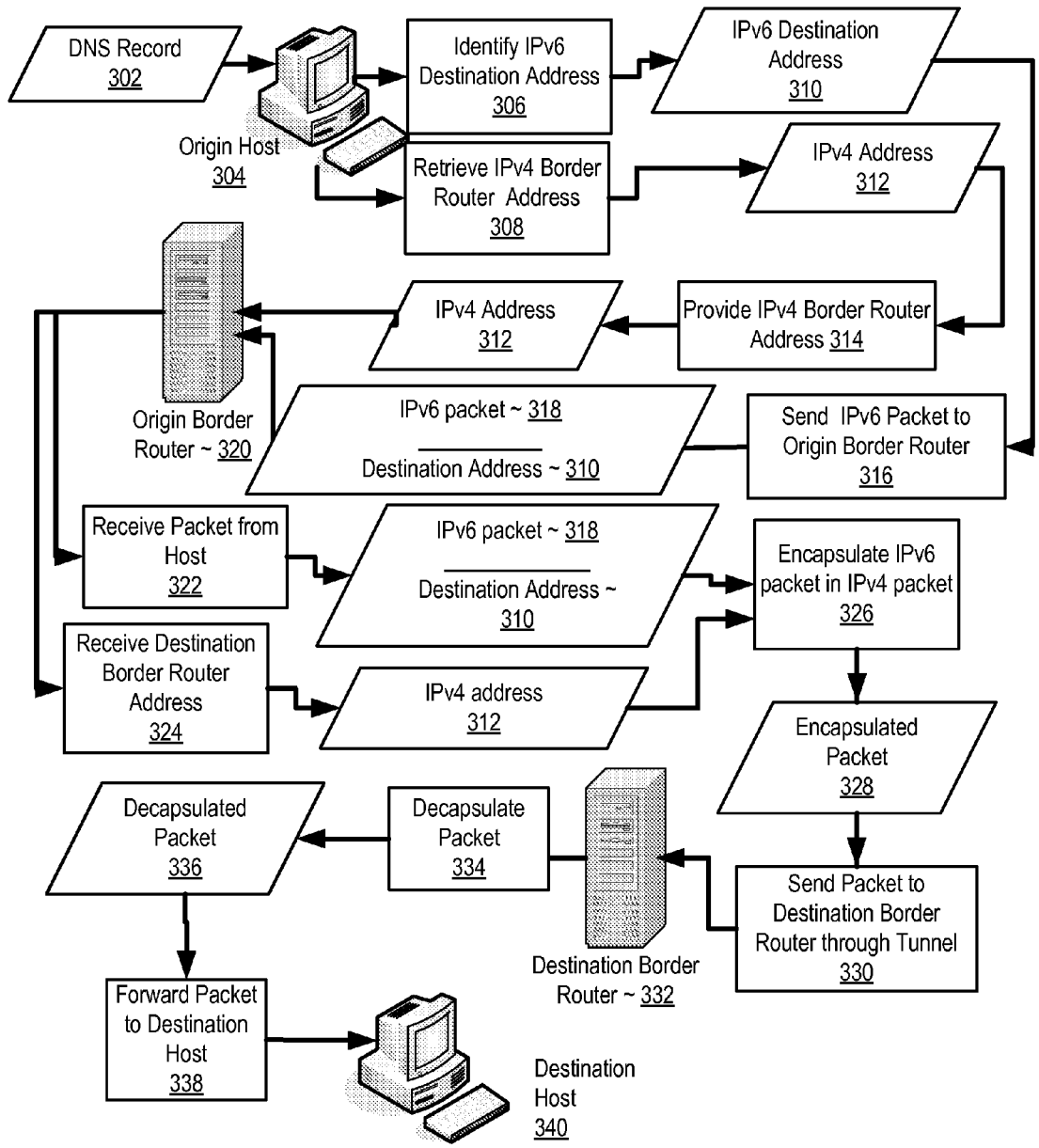
FIG. 3 sets forth a flow chart illustrating an exemplary method for tunneling IPv6 packets.

For further explanation, FIG. 3 sets forth a flow chart illustrating an exemplary method for tunneling IPv6 packets. The method of FIG. 3 includes identifying (306), by the IPv6 host (304), an IPv6 destination address (310) for the packet. In the method of FIG. 3, identifying (306), by the IPv6 host (304), an IPv6 destination address (310) for the packet typically includes resolving a domain name for the destination host by use of the DNS service. As discussed above, the Domain Name System ("DNS") is a name service typically associated with the Internet that that translates domain names into network addresses.

The method of FIG. 3 includes retrieving (308), from a DNS record (302), an IPv4 address (312) for a destination IPv6 border router (332). The DNS resource record (302) of FIG. 3 also includes not only the IPv6 destination address for a domain name, but also an IPv4 address for a border router capable of receiving an encapsulated IPv6 packet intended for the IPv6 destination address and also capable of decapsulating the packet and forwarding the decapsulated packet to the destination address. Such a DNS resource record modified in accordance with the present invention advantageously provides a vehicle to associate IPv6 network addresses with a preferred border router to receive IPv6 packets intended for the host at the IPv6 network address.

For further explanation, FIG. 4 sets forth an exemplary data structure useful in tunneling IPv6 packets in accordance with the present invention. The example of FIG. 4 includes a DNS resource record (452) modified in accordance with the present invention. The DNS resource record (452) of FIG. 4 includes a domain name field (454) including the domain name of a destination host. The DNS resource record (452) of FIG. 4 also includes a IPv6 network address (456) for the destination host. The DNS resource record (452) of FIG. 4 further includes an IPv4 network address (458) identifying a border router capable of decapsulating an encapsulated IPv6 message and forwarding the decapsulated message to the intended destination IPv6 network address. While the exemplary DNS resource record (452) includes the IPv4 border router address (458) as a field within the record, in alternative embodiments, the IPv4 border router address may be provided in a separate record of type 'BR' designed to contain IPv4 border router addresses. The exemplary DNS resource record of FIG. 4 is presented for explanation and not for limitation. In fact, IPv6 destination addresses and addresses for border routers may be associated in any data structure as will occur to those of skill in the art. Furthermore, the DNS resource record (452) of FIG. 4 is simplified for clarity of explanation. Typical DNS records modified in accordance with the present invention will include more fields than those presented in the example of FIG. 4, such as, for example, record type, time to live data for the record, and so on as will occur to those of skill in the art.

Again with reference to FIG. 3: The method of FIG. 3 also includes sending (316) an IPv6 packet (318) having the IPv6 destination address (310) to the origin IPv6 border router (320) and providing (314) to an origin IPv6 border router (320) an IPv4 address (312) for an associated destination IPv6 border router (332) for the IPv6 packet. One way of providing (314) to an origin IPv6 border router (320) an IPv4 address (312) for an associated destination IPv6 border router (332) for the IPv6 packet is carried out by embedding the IPv4 address of the destination border router in an extension header of the IPv6 packet. IPv6 provides extension headers to provide a practical means to implement additional routing options. The extension headers are placed between the transport layer header and the IPv6 header. Several types of extension headers are defined for IPv6, and a value in a 'next header' field identifies that another extension header follows. The extension headers are placed in order so that a router can stop reading the next header field once it reaches the last value or extension header that may pertain to the router. All of the extension options do not have to be processed by each router that the packet traverses along its way to the destination. In fact, many IPv6 extension headers are not processed until they arrive at the destination. Many options have already been defined for use in IPv6 Extension Headers. Examples of already defined extension headers include:

Routing Extension Headers. Routing extension headers control the routing of a packet. The routing extension header may explicitly dictate the route from the source to the destination. The IPv6 address of each of the nodes along the path are included, and the destination then uses the reverse path for communication as well.

Fragmentation Headers. Fragmentation headers define how fragmented packets are to traverse the IPv6 network.

Authentication Headers. Authentication headers use an authentication algorithm to ensure that the IPv6 packet has not been altered along its path. The header also ensures that the IPv6 packet has arrived from the source listed in the IP Header.

Hop-by-Hop Header. IPv6 implements an efficient method to alert routers of a packet that requires special processing. Packets that do not contain the IPv6 hop-by-hop extension header are not fully processed by each router, instead they are allowed to quickly continue on their way to their destination. The hop-by-hop extension header allows routers to quickly identify and fully process packets that require special route handling. Routers that recognize this header examine the packets accordingly, routers that do not recognize this option ignore it.

Providing (314) to an origin IPv6 border router (320) an IPv4 address (312) for an associated destination IPv6 border router (332) by embedding the IPv4 address of the destination border router in an extension header of the IPv6 packet may be carried out through the use of a new extension header containing the IPv4 address of the destination border router for the IPv6 packet according to embodiments of the present invention. Providing the IPv4 address of the destination border router in the packet itself advantageously removes the need to manually configure the origin border router with addresses of other border routers. Instead, the origin border router is provided with the routing information needed to tunnel the IPv6 packet to a destination border router on a packet-by-packet basis.

The method of FIG. 3 also includes receiving (322), by an origin IPv6 border router (320) from an origin IPv6 host (304), an IPv6 packet (318) having an IPv6 destination address (310) and receiving (324), by an origin IPv6 border router (320) from an origin IPv6 host (304), an IPv4 address (312) for a destination IPv6 border router (332). In the method of FIG. 3, the IPv4 address (312) for a destination IPv6 border router (332) is received embedded in an extension header of the IPv6 packet itself.

Figure 5:
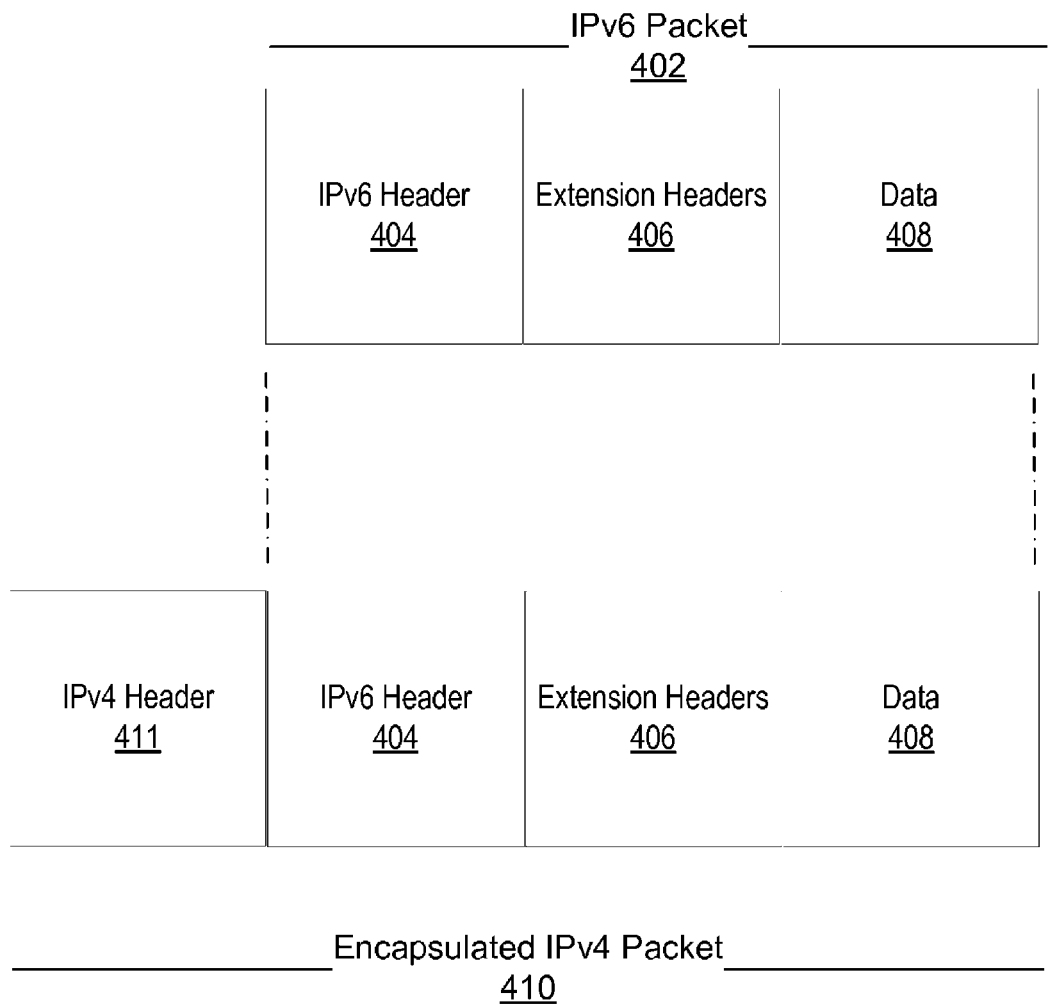
FIG. 5 sets forth a block diagram illustrating an embedded packet in accordance with the present invention.

The method of FIG. 3 also includes encapsulating (326), by the origin IPv6 border router (320), the IPv6 packet (318) in an IPv4 packet (328). In the method of FIG. 3, encapsulating (326), by the origin IPv6 border router (320), the IPv6 packet (318) in an IPv4 packet (328) is carried out by adding an IPv4 header to the IPv6 packet. Adding an IPv4 header to the IPv6 packet allows the origin border router to transmit the embedded packet across an IPv4 network. For further explanation, FIG. 5 sets forth a block diagram illustrating an embedded packet in accordance with the present invention. In the example of FIG. 5, an IPv6 packet (402) containing an IPv6 header (404) followed by extension headers (406) identifying to the origin border router the IPv4 address to send the encapsulated packet, and containing data (408) to be transmitted to the designation host is encapsulated in an IPv4 packet (410). In the example of FIG. 5, the encapsulated IPv4 packet (410) has an IPv4 header (411) added to IPv6 header (404), the extension headers (406), and the data. The encapsulated IPv4 packet (410) having the added IPv4 header is transmittable across an IPv4 network.

Again with reference to FIG. 3: The method of FIG. 3 also includes sending (330) the encapsulated packet (328) to a destination IPv6 border router (332) at the IPv4 address (312). In the example of FIG. 3, the encapsulated packet is sent to an IPv4 address identified by the origin host and embedded in extension headers within the IPv6 packet encapsulated within the IPv4 packet.

The method of FIG. 3 also includes decapsulating (334), by the destination IPv6 border router (332), the encapsulated packet (328) and forwarding (338), by the destination IPv6 border router (332), the decapsulated packet (336) to a destination host (340) having the destination IPv6 address. In the method of FIG. 3, decapsulating (334), by the destination IPv6 border router (332), the encapsulated packet (328) is carried out by removing an IPv4 header added by the origin border router (320) from the encapsulated packet.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for tunneling IPv6 packets, the system comprising:
    means for receiving, by an origin Internet Protocol Version 6 (IPv6) border router from an origin IPv6 host, an IPv6 packet having an IPv6 destination address;
    means for receiving, by an origin IPv6 border router from an origin IPv6 host, an IPv4 address for a destination IPv6 border router retrieved from a data structure associating IPv6 destination addresses with Internet Protocol Version 4 (IPv4) addresses for destination IPv6 border routers, wherein the data structure associating IPv6 destination addresses with IPv4 addresses for destination IPv6 border routers further comprises a Domain Name System (DNS) resource record that includes the IPv6 destination address for a domain name, and an IPv4 address for a border router capable of receiving an encapsulated IPv6 packet;
    means for encapsulating, by the origin IPv6 border router, the IPv6 packet in an IPv4 packet, including means for adding an IPv4 header to the IPv6 packet;
    means for sending the encapsulated packet to a destination IPv6 border router at the IPv4 address;
    means for decapsulating, by the destination IPv6 border router, the encapsulated packet, including means for removing an IPv4 header added by the origin border router from the encapsulated packet; and
    means for forwarding, by the destination IPv6 border router, the decapsulated packet to a destination host having the destination IPv6 address.

2. The system of claim 1 further comprising:
    means for identifying, by the IPv6 host, an IPv6 destination address for the packet; and
    means for retrieving, from a data structure associating IPv6 destination addresses with IPv4 addresses for destination IPv6 border routers, an IPv4 address for a destination IPv6 border router;
    means for sending an IPv6 packet having the IPv6 destination address to the origin IPv6 border router, and
    means for providing to an origin IPv6 border router an IPv4 address for an associated destination IPv6 border router for the IPv6 packet.

3. A computer program product for tunneling Internet Protocol Version 6 (IPv6) packets, the computer program product comprising:
    a recording medium;
    means, recorded on the recording medium, for receiving, by an origin IPv6 border router from an origin IPv6 host, an IPv6 packet having an IPv6 destination address;
    means, recorded on the recording medium, for receiving, by an origin IPv6 border router from an origin IPv6 host, an Internet Protocol Version 4 (IPv4) address for a destination IPv6 border router retrieved from a data structure associating IPv6 destination addresses with IPv4 addresses for destination IPv6 border routers, wherein the data structure associating IPv6 destination addresses with IPv4 addresses for destination IPv6 border routers further comprises a Domain Name System (DNS) resource record that includes the IPv6 destination address for a domain name, and an IPv4 address for a border router capable of receiving an encapsulated IPv6 packet;
    means, recorded on the recording medium, for encapsulating, by the origin IPv6 border router, the IPv6 packet in an IPv4 packet, including means, recorded on the recording medium, for adding an IPv4 header to the IPv6 packet;
    means, recorded on the recording medium, for sending the encapsulated packet to a destination IPv6 border router at the IPv4 address;
    means, recorded on the recording medium, for decapsulating, by the destination IPv6 border router, the encapsulated packet, including means, recorded on the recording medium, for removing an IPv4 header added by the origin border router from the encapsulated packet; and
    means, recorded on the recording medium, for forwarding, by the destination IPv6 border router, the decapsulated packet to a destination host having the destination IPv6 address.

4. The computer program product of claim 3 further comprising;
    means, recorded on the recording medium, for identifying, by the IPv6 host, an IPv6 destination address for the packet; and
    means, recorded on the recording medium, for retrieving, from a data structure associating IPv6 destination addresses with IPv4 addresses for destination IPv6 border routers, an IPv4 address for a destination IPv6 border router;
    means, recorded on the recording medium, for sending an IPv6 packet having the IPv6 destination address to the origin IPv6 border router; and
    means, recorded on the recording medium, for providing to an origin IPv6 border router an IPv4 address for an associated destination IPv6 border router for the IPv6 packet.

* * * * *